United States Patent
Ghaddar et al.

(10) Patent No.: US 9,659,253 B1
(45) Date of Patent: May 23, 2017

(54) SOLVING AN OPTIMIZATION MODEL USING AUTOMATICALLY GENERATED FORMULATIONS IN A PARALLEL AND COLLABORATIVE METHOD

(71) Applicant: International Business Machines Corporation, Armonk, NY (US)

(72) Inventors: Bissan Ghaddar, Dublin (IE); Marco Laumanns, Zurich (CH); Chungmok Lee, Gyeonggi-do (KR); Martin Mevissen, Dublin (IE); Nicole Taheri, Dublin (IE); Susara Van Den Heever, Dublin (IE); Rudi Verago, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/015,562

(22) Filed: Feb. 4, 2016

(51) Int. Cl.
*G06N 3/12* (2006.01)
*G06N 5/04* (2006.01)

(52) U.S. Cl.
CPC ...... *G06N 5/04* (2013.01); *G06N 3/12* (2013.01)

(58) Field of Classification Search
None
See application file for complete search history.

(56) References Cited

U.S. PATENT DOCUMENTS 7,835,891 B2 11/2010 Kumar et al.

OTHER PUBLICATIONS

Hey, et al., Electromagnetic Actuator Design Analysis Using a Two-Stage Optimization Method With Coarse—Fine Model Output Space Mapping, IEEE Transactions on Industrial Electronics, vol. 61, No. 10, Oct. 2014, pp. 5453-5464.*
Wakabayashi, et al., Genetic Algorithm Accelerator GAA-II, Proceedings of the Asia and South Pacific Design Automation Conference 2000 (ASP-DAC'00), 2000, pp. 9-10.*
Brameier, et al., Evolving Teams of Predictors with Linear Genetic Programming, Genetic Programming and Evolvable Machines, vol. 2 Issue 4, Dec. 2001, pp. 381-407.*

* cited by examiner

*Primary Examiner* — Wilbert L Starks
(74) *Attorney, Agent, or Firm* — Scully, Scott, Murphy & Presser, P.C.; Kurt P. Goudy, Esq.

(57) ABSTRACT

A method, apparatus and computer program product for solving an optimization model by automatically creating alternative formulations, and solving those with parallel solution approaches communicating with each other. The method: automatically generates alternative formulations for a given optimization model; executes parallel communicating solution approaches in a parallel computing infrastructure in order to solve a given set of alternative model formulations; utilizes a mechanism to automatically detect the model structure and a mechanism to automatically detect the appropriate solution approach(es) for a given model structure, and to launch multiple parallel solution approaches at existing optimization solvers. The system and methods enable communication between parallel solution approaches in order to improve performance. The system communicates information between the parallel solution approaches during a solve process, in order to improve performance. The communicated information includes information on upper and lower bounds of running algorithms and information on decision variables values for feasible intermediate solutions.

17 Claims, 8 Drawing Sheets

SOLVING AN OPTIMIZATION MODEL USING AUTOMATICALLY GENERATED FORMULATIONS IN A PARALLEL AND COLLABORATIVE METHOD

FIELD

The present disclosure relates to the field of optimization modeling, and particularly to numerically solving optimization models more efficiently via parallel computing by automatically creating alternative model formulations, and solving the resulting models in parallel or in sequence (by using a time slice for each formulation) using alternative solution approaches which communicate with each other in order to improve performance.

BACKGROUND

Solving complex optimization models is NP-hard, meaning the solution time increases exponentially in the worst case. This, together with other challenges such as uncertainty and nonlinearity, result in many real-world optimization models not being solvable in reasonable time. Using alternative formulations and solution approaches could speed up the solution process, but finding alternative approaches is still a manual process requiring deep optimization expertise.

Currently, there is no system or methods available to automatically generate alternative approaches through built-in expert knowledge.

SUMMARY

A system, method and computer program product for automatically reformulating a given optimization model into alternative formulations and then, implementing a parallel solution of the alternative formulations with alternative solution approaches which communicate with each other to improve performance.

In accordance with one aspect, there is provided a method to solve an optimization model. The method comprises: receiving, at a computing device, data representing a formula and parameters associated with the optimization model to be solved; automatically analyzing, by the computing device, a structure of the received data to identify an alternative formulations of the model; automatically generating, by the computing device, data representing one or more reformulated problems, each reformulated problem having a different structure and associated parameters for solving the optimization model; for each reformulated problem, determining a number of solver devices for use in solving the reformulated problem in one of: parallel or sequentially; and communicating, by the computing device, the generated data representing a respective reformulated problem to a respective determined number of solver devices for solving that reformulated problem, each respective solver device of the determined number receiving data associated with a respective reformulated problem and each the solver device of the determined number configured to solve the respective reformulated problem; and receiving, at the computing device, further data from each respective other solver device for use in determining an optimal solution to said optimization model.

In another embodiment, there is provided a system to solve an optimization model. The system comprises: a memory storage device for storing data representing an optimization model to be solved; one or more hardware processor units in communication with the memory storage device, and at least one hardware processor unit configured to: receive data representing a formula and parameters associated with the optimization model to be solved; automatically analyze a structure of the received data to identify an alternative formulations of the model; automatically generate data representing one or more reformulated problems, each reformulated problem having a different structure and associated parameters for solving the optimization model; and for each reformulated problem, determine a number of other hardware processor units running a solver for use in solving the reformulated problem in one of: parallel or sequentially; communicate the generated data representing a respective reformulated problem to a respective determined number of other hardware processor units running a solver for solving that reformulated problem, each respective hardware processor unit running a solver receiving data associated with a respective reformulated problem, and each the respective hardware processor unit of the determined number configured to solve the respective reformulated problem; and receive further data from each respective other hardware processor unit running a solver for use in determining an optimal solution to the optimization model.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

A system to solve an optimization model by automatically creating alternative model formulations, and solving the resulting models in parallel or in sequence where a time slice is allocated to each formulation using alternative solution approaches which communicate with each other.

A system and method to solve an optimization model by automatically creating alternative formulations, and solving those with parallel solution approaches communicating with each other.

Figure 1:
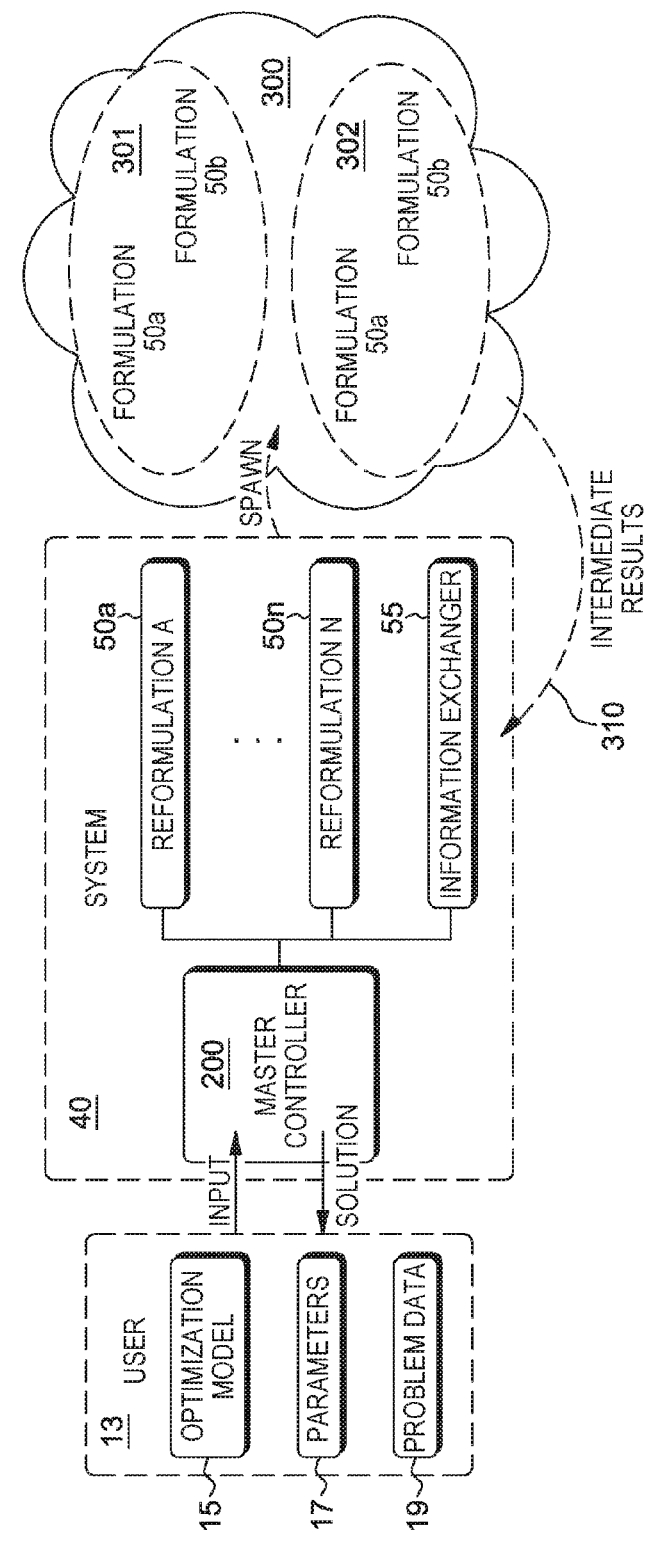
FIG. 1 depicts a general block diagram of a computer-implemented system for solving an optimization model according to the embodiments described herein

FIG. 1 depicts a general block diagram of a computer-implemented system 40 for solving an optimization model according to the embodiments described herein. In FIG. 1, computer system 40 runs modules for solving an optimization model by automatically creating alternative model formulations, and implementing a computing infrastructure to solve the resulting models in parallel or in sequence where a time slice is allocated to each formulation using alternative solution approaches which communicate with each other. In one embodiment, a master controller component 200 receives input from a user device 13, with an input optimization model 15 and associated optimization parameters (e.g., constraints) 17 and problem data 19 from the user device 13. Master controller runs a method configuring the system to automatically create alternative formulations 50a, . . . , 50n of the optimization model, and solve those formulations with parallel solution approaches communicating with each other via an information exchange component 55 to expedite the solving. Although not shown, a further user-specified input may comprise a specific tolerance value "tol" which determines a point at which parallel processing of alternative model formulations may be terminated. An example input may be, for example, a solution value within 10% of a determined optimal value. Additional inputs specified by the user may include any information that the user may know about the problem or is interested in exploiting to increase the efficiency of the processing. Further information entered by a user may include a time limit parameter, e.g., one hour, within which the problem is to be solved.

In the embodiment shown in FIG. 1, the system 40, particularly master controller (MC) 200 communicates with an infrastructure 300 of computer solver devices 350 which may form, for example, a data center, or a "cloud" computing environment. The MC implements the computer solver(s) 350 and initiates configuring respective one or more solvers to operate on and provide solutions for a reformulated optimization model problem 50a, . . . , 50n according to various reformulated approaches. For example, two solver devices 350 may be configured to solve optimization problems 50A and 50B according to a first solver approach 301 and a second solver approach 302, with intermediate results 310 provided to information exchanger 55 which passes results to various other reformulations to aid used in solving the original optimization problem.

Once the optimization problem is solved, master controller component 200 forwards the solution, e.g., over a communications network, back to the user device for viewing of the best solution via an interface, e.g., a display device.

Figure 2:
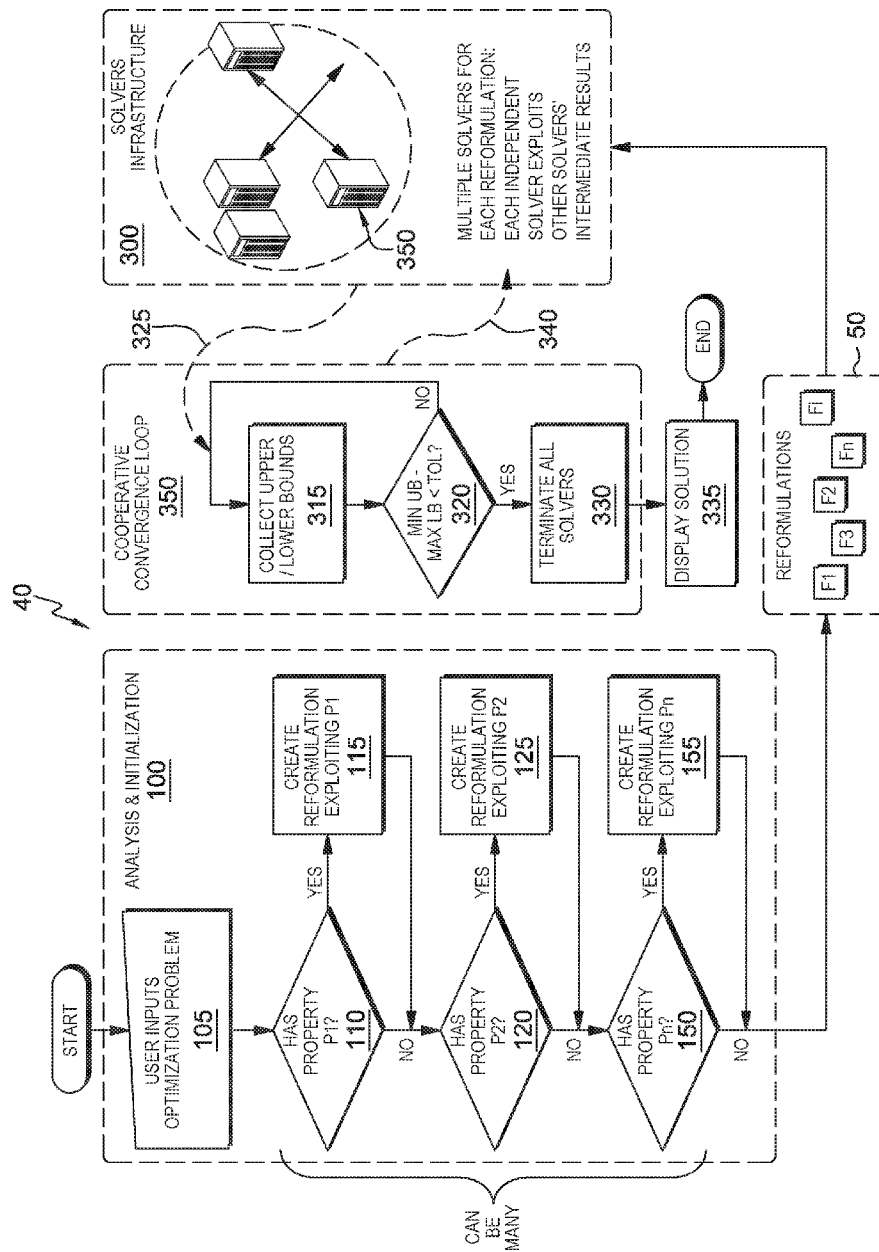
FIG. 2 shows a detailed block diagram depicting the method steps implemented in the system to automatically create alternative model formulations, and solve the resulting models in parallel according to one embodiment.

FIG. 2 shows a detailed block diagram depicting the method steps 100 implemented in the system 40 to automatically create alternative model formulations, and solve the resulting models in parallel or in sequence where a time slice is allocated to each formulation using alternative solution approaches. In FIG. 2, method 100 is run in an analysis and initialization stage which runs a first step 105 to receive the user inputs, e.g., via a well-known modeling or optimization program running on device 13, representing an optimization problem, e.g., a mathematical equation(s), in any format, including any objective function, parameters, constraint(s), or any other type of data used for solving the problem. Processing in system 40, such as performed by master controller component, initially determines the type of problem, and based on certain inherent properties of the problem, implements methods to create reformulations of the problem that exploits the particular property.

For example, at step 110, FIG. 2, master controller is configured to automatically analyze the input problem and make a determination as to the optimization model's property, its structure and its type, and whether any additional information appurtenant to solve the problem has been input by the user to aid in solving the input optimization problem. For example, using techniques known in the art, including an analysis of the input optimization problem, it may be determined that the optimization problem includes properties such as, e.g., is decomposable, polynomial, linear, non-linear, quadratic, convex, non-convex, etc. In dependence upon each property type determined, the original optimization model is reformulated to exploit the particular property type found for the original problem. For example, as shown at 110 in the method of FIG. 2, if analyzing the problem reveals a problem property P1, then at 115, the system automatically generates an alternative relevant formulation for the given optimization model to exploit property P1 and proceeds to step 120. If the determination at 110 reveals that the problem is not of a property P1 type, then the method will proceed to step 120 to determine the next property type P2. Thus, at 120 if analyzing the problem reveals a problem property P2, then at 125, the system automatically generates a relevant alternative formulation for the given optimization model to exploit property P2. If the determination at 120 reveals that the problem is not of a property P2 type, then the method will proceed to the next step and repeat the property determination process until a final step is reached. Thus, for example, a final step 150 shows an analysis of the problem to determine whether the original input problem exhibits a final property characteristic Pn, for which, if this property is determined, at 155, the system automatically generates an alternative formulation for the given optimization model to exploit the property Pn. Thus, the analysis method 100 may determines one or more properties that can be exploited by reformulating the original problem.

Then, via use of the master controller 200, a set 50 of one or more reformulated optimization problems determined at steps 115, 125, 155, etc. that exploit a respective property type of the optimization model structure, are communicated to the computer device infrastructure 300 where computer solver techniques known in the art are initiated to solve each reformulated problem. In one embodiment, a corresponding one or multiple solvers are implemented for each received reformulated problem, and these solvers run in parallel for each reformulation. Each independent solver exploits another solver's intermediate results. For example, as shown in FIG. 2, the reformulated problems of alternative problems set 50 are solved in parallel and intermediate results generated, e.g., bound values, in intermediate solutions obtained at the respective solver, are communicated back via communications link 325 to a cooperative convergence loop module 350 run by the MC 200 of system 40. The cooperative convergence loop module 350 receives and gathers the intermediate results of running algorithms, e.g., upper/lower boundary values, from a respective solver and checks whether bounds coincide. For each reformulation, the system determines an appropriate solver or multiple solvers depending upon the reformulated approach of the problem taken.

For example, as shown in FIG. 2, cooperative convergence loop module 350 receives data at 315 from each of the different solvers representing upper and lower bounds resulting from a solving a respective reformulated problem at infrastructure 300. From the collected upper/lower bound data, e.g., including a current solution or a current constraint being communicated, a determination is then made at 320 whether a difference between a received minimum upper bound intermediate result value and a received maximum lower bound intermediate result value that are received from the solving is less than a pre-specified tolerance value "tol". If the difference between a received minimum upper bound intermediate result value and a received maximum lower bound intermediate result value that are received from the solving is greater than or equal to the pre-specified tolerance value "tol", then the process will return to step 315 in order to collect further upper/lower bound values for the same reformulated problem in which case the process will repeat and continue at step 320. In the cooperative convergence loop process 350, intermediate solutions are communicated at 340 between different solvers which may speed up solver processing and achieve a convergence quickly and extract useful information on the fly. Once, at 320, it is determined that the difference between a received (minimum) upper bound intermediate result value and a received (maximum) lower bound intermediate result value that are received from the solving is less than a specified tolerance value, then it is determined that an optimal solution to the reformulated optimization problem has been found, and the process proceeds to step 330 to generate a signal back to the parallel running solvers to initiate terminating operations of the solvers used in solving the parallel reformulated problem(s). Subsequently, the solution to the original problem is communicated back to a user device at 335, e.g., device 13 of FIG. 1, where the output solution may be displayed via an interface device, e.g., a display device, and the method ends.

Figure 3:
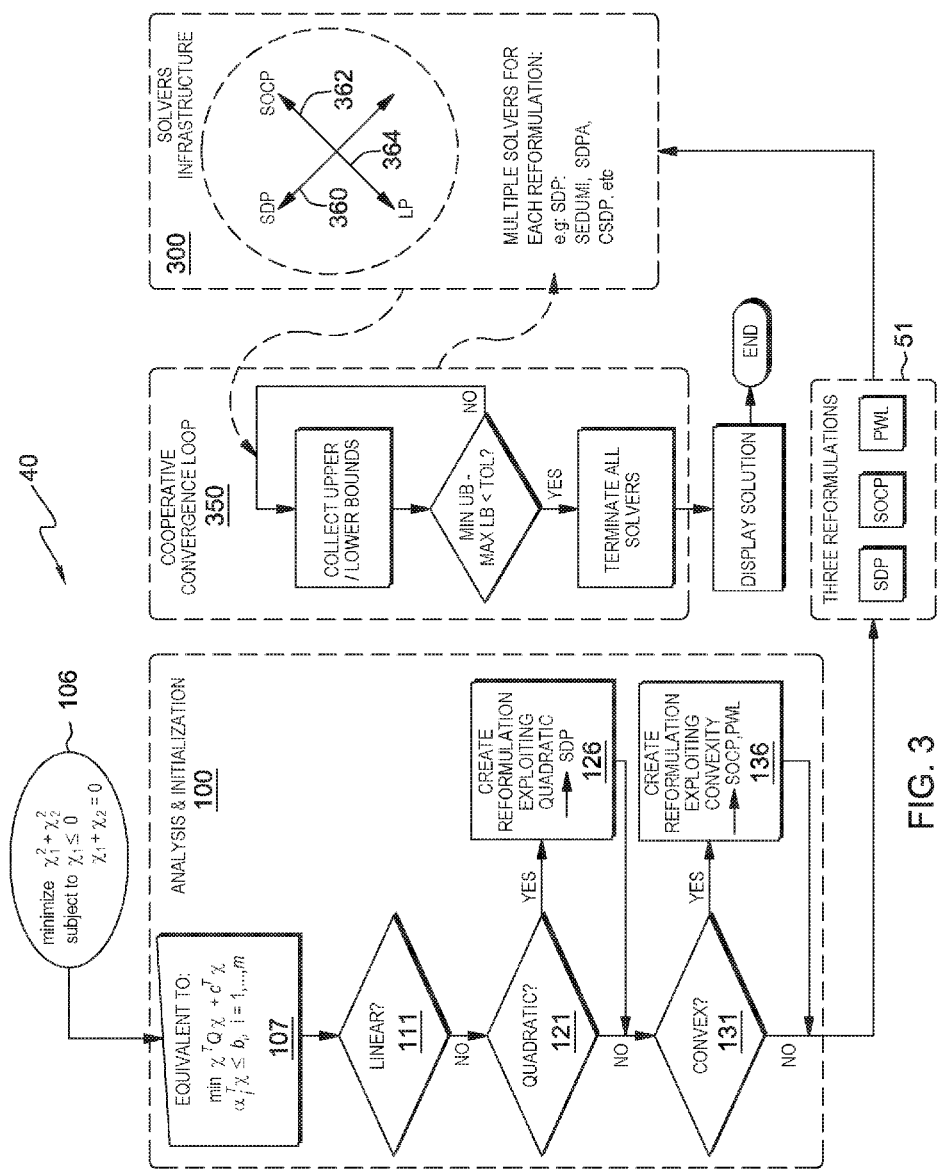
FIG. 3 shows an example implementation of an analysis method of FIG. 2 performed to solve a convex quadratic optimization problem.

FIG. 3 shows an example implementation of the method 100 of FIG. 2 performed to solve a convex quadratic problem. In FIG. 2, an example mathematical equation data 106 representing a convex quadratic optimization problem with two variables (e.g., min $x_1^2+x_2^2$), is input to the system 40 which is to perform a minimization of the optimization problem subject to various example constraints (e.g., $x_1 \leq 0$ and $x_1+x_2=0$). At 107, FIG. 3, the determination is made that this type of input optimization problem has an equivalent formulation (e.g., min $x^T Q_x + C^T$ subject to $a_i^T x \leq b_i$ where i=1, ..., m)) where Q=[1 0; 0 1], c=0 and the two constraints are $x_1 \leq 0$ and $x_1+x_2=0$ is input to the system in this example. Given the example input, method 100 determines at 111 whether the input example minimization problem is linear. As this equivalent problem (min $x^T Qx+c^T$ subject to $a_i^T x \leq b_i$ where i=1, ..., m) is not linear, the process will proceed to step 121 where method 100 determines whether the input example minimization problem is quadratic. As this equivalent equation 107 is a quadratic equation, at 126, the method generates a reformulated optimization problem that exploits the quadratic nature of the optimization problem. Thus, in this example, as the input is quadratic, the system 40 determines that the problem may be reformulated as a Semidefinite problem (SDP). Generally, for SDP reformulating, there is minimized: a quadratic objective function subject to quadratic and linear constraints and where variables can be binary or continuous. It is understood that SDP Reformulating can also be used on polynomial programs (Lasserre) type optimization model inputs. Thus, there is generated at 126 a reformulated optimization problem of a convex SDP problem form and the process proceeds to 131 where method 100 determines whether the input example equivalent minimization problem 107 is of another property type, e.g., convex. As the equivalent equation is a convex quadratic equation, at 136, the method generates a reformulated optimization problem that exploits the convex nature of the optimization problem. Thus, in this example, as the input is convex, the system 40 determines that the problem may be reformulated as a second-order cone problem (SOCP). Further, processing at 136 further determines that the equivalent problem may additionally be reformulated as a piecewise linear function problem (PWL).

In a particular example, analysis processing method 100 has determined that the original example convex quadratic optimization problem structure with two variables (e.g., min $x_1^2+x_2^2$) could be reformulated as three equivalent problems set 51, each equivalent problem rendered in the form of three separate structured SDP, SOCP and PWL problems which are input to the solver infrastructure 300. In solver infrastructure 300, multiple solvers are configured for solving each reformulation in parallel, e.g., one or more solver computing devices 360 for solving the SDP reformulation; one or more solver computing devices 362 for solving the SOCP reformulation; and one or more solver computing devices 364 for solving the PWL reformulation.

In other embodiments, analysis and reformulation processing method 100 may determine for other types of input optimization problems the following other types of reformulations including, but not limited to: a quadratic convex reformulation (QCR) associated with an input problem for minimizing a quadratic objective function subject to linear equality constraints and the variables are binary. With QCR reformulation, the output problem is a binary program with a convex quadratic objective function; a Reformulation-linearization technique (RLT) reformulation associated with a received linearly constrained nonconvex quadratic programming input problem structure. With RLT reformulation, the output problem is a linear program. Other types of reformulations include, but are not limited to: Hybrid SDP/LP Reformulation to exploit SDP and LP relaxation within the framework provided MINLP (mixed-integer nonlinear program) solvers when tackling a BQP (Binary Quadratic Program); and Convex Over- and Under-envelopes for Nonlinear Estimation: wherein an input is: a MINLP and the output is LP. For a Piece-wise linear (PWL) reformulation, the input problem is a convex NLP problem and the output is a linear program (LP).

Figure 4:
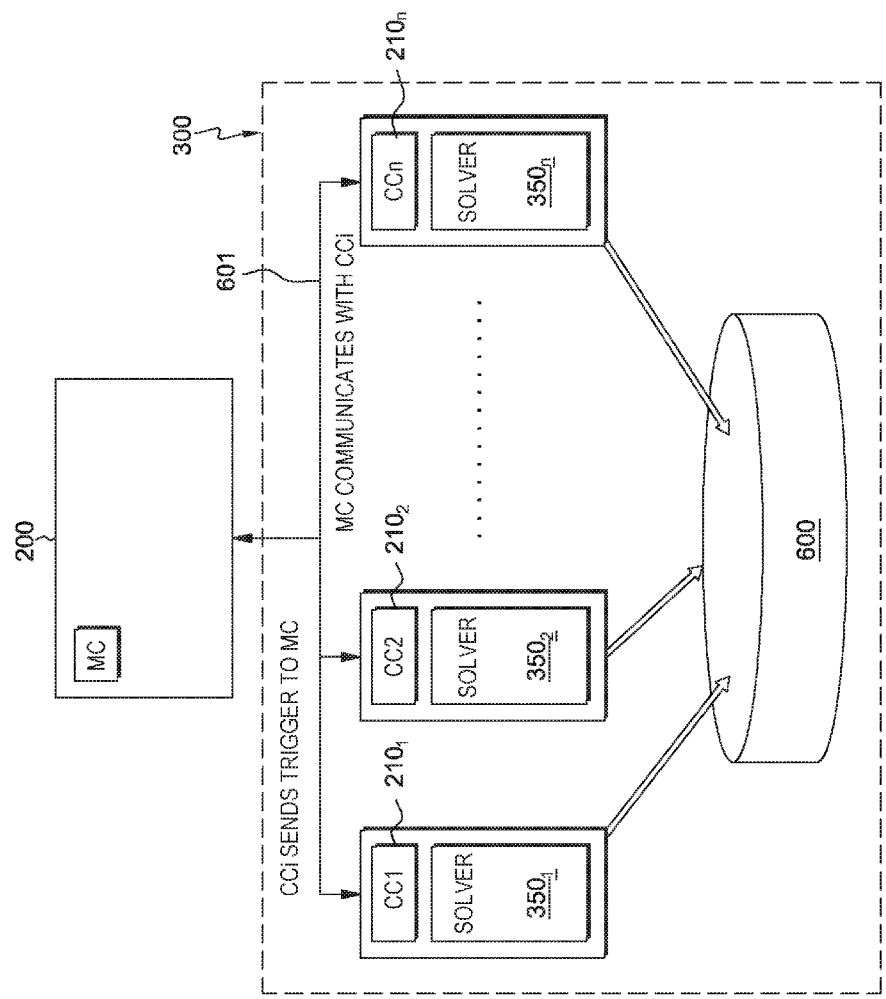
FIG. 4 shows communication between the master controller module and up to "n" client controller devices corresponding with a respective solver (computing) device, via a respective wired, wireless and/or networked connection(s)

FIG. 4 shows a more detailed view of the system 40 and the master control module 200 which performs various functions including, but not limited to: automatically determining structure of input optimization problems and automatically generating corresponding reformulation problems; receiving other reformulation problems as may be input by a user; choosing one or more solvers for each reformulation; initiate the running of the one or more solver devices; communicating with a client controller (CC) associated with a respective solver and update information from that solver such as lower bounds (LB), upper bounds (UB), etc. and determining whether a termination criteria has been met.

FIG. 4 more particularly shows communication between the master controller (MC) module 200 and up to "n" client controller devices $210_1, 210_2, \ldots, 210_n$ corresponding with a respective solver device, i.e., computing devices $350_1, 350_2, \ldots, 350_n$, via a respective wired, wireless and/or networked connection(s) 601. In the embodiment of FIG. 4, as depicted, the MC 200 communicates with a respective solver via the respective individual client controller (CC); an individual client controller 210$_1$, 210$_2$, . . . , 210$_n$ may additionally send a trigger to the master controller MC to inform of availability of the solver and initiate processing at a respective solver. Thus, for example, when there is a change inside a solver, e.g., a new solution, a new change in a bound, or any new information, the respective associated client controller will send the information to the master controller, the controller decides the relevance and importance of the received information, and will act accordingly. For instance, good information received from a client controller may be distributed to the other client controllers for use at each controller's respective solver.

In one embodiment, the system communicates information between the parallel solution approaches during the solving process, in order to improve performance. Information communicated amongst the solvers in solving a particular problem includes but are not limited to: on upper and lower bounds; and information on decision variable(s) value(s) for feasible intermediate solutions. In one embodiment, master controller 200 includes knowledge of actual algorithms performed at the respective solvers in solving the reformulated problems, e.g., algorithms such as: Branch-and-bound, branch-and-cut, interior-point-methods, first-order methods, heuristics, LP/SOCP/SDP, etc. Thus, when receiving intermediate results or solutions, master controller 200 can communicate with each of the client controllers 210$_1$, 210$_2$, . . . , 210$_n$ and hence, their corresponding respective solver devices 350$_1$, 350$_2$, . . . , 350$_n$ to exchange information including but not limited to: Lower Bounds (LB), i.e., various reformulations provide different lower bounds that can be exchanged at the solving stage; Upper Bounds (UB), i.e., various reformulations lead to different feasible solutions and incumbent values that can be shared at the solving stage; Valid Inequalities, e.g., cuts generated using various reformulations can be exchanged to tighten the different relaxations; and partial gradient information (e.g., a reduced cost) which is the information outputted by the solvers about the dual variables of the reformulated problem.

The solvers provide information to the MC controller, and the controller decides which information is useful or not, and communicate the information back to other solvers. In one embodiment as shown in FIG. 4, there are various communications options for information exchange between the master controller and client controllers (solvers) including, but not limited to: use of a shared memory storage device 600, e.g., a database.

Figure 5:
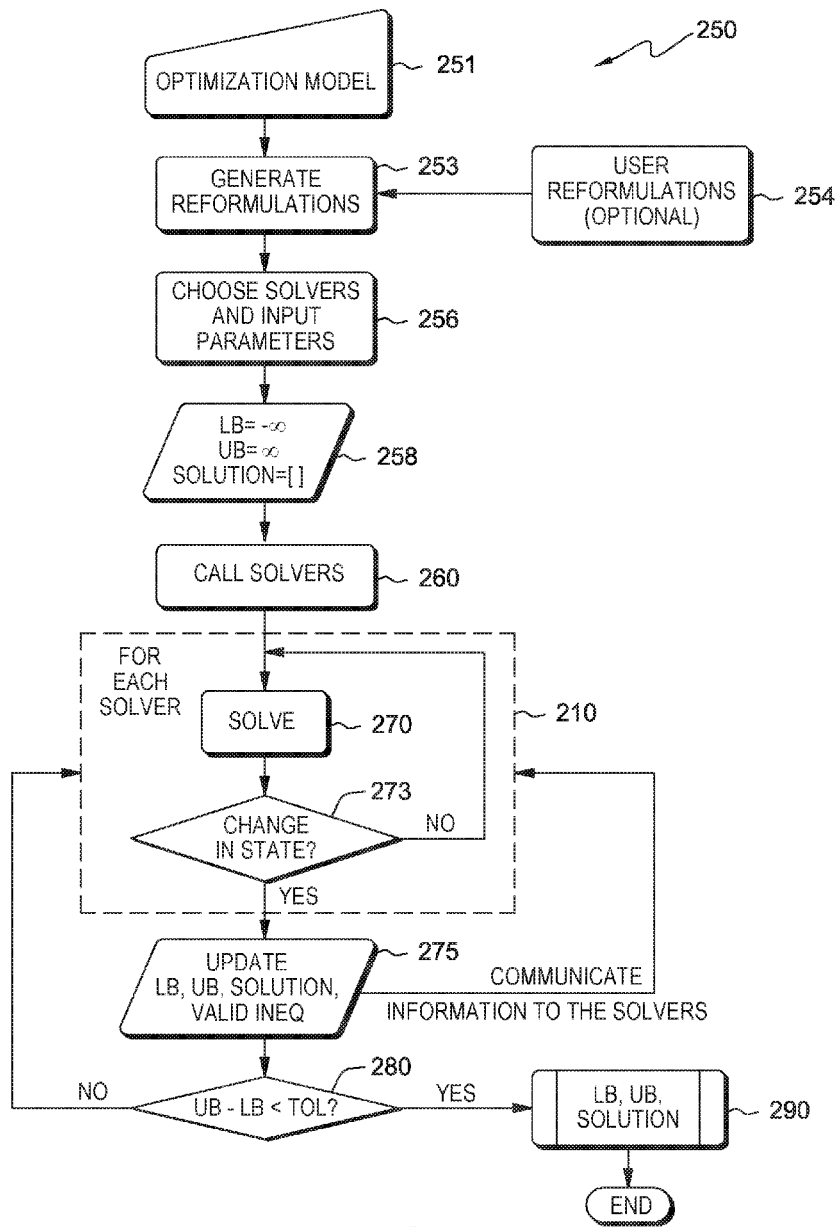
FIG. 5 shows a processing method implemented by the master controller for cooperative convergence loop processing for an input optimization model in one embodiment.

FIG. 5 shows a processing method 250 implemented by the master controller 200 for cooperative convergence loop processing for an input optimization model 251. At a first step 253, there are generated the one or more reformulations in the manner as described in FIG. 2. The reformulations can further include user information 254 such as specified parameters or user specification of known structures and properties of the input optimization model. Then at 256, based on the determined and/or specified reformulations, the system performs choosing the amount/types of solvers and input parameters used by the solver needed in solving the input model. Continuing, at 258, the respective upper bound limit (UB) and lower bound limit (LB) of the original optimization model, are set to ∞, −∞ respectively. Additionally, the solution set of the original optimization model is set to empty, e.g., [ ]. At 260, the master controller communicates a signal to each of one or more of the client controllers 210$_1$, 210$_2$, . . . , 210$_n$ wherein in response a client controller triggers operation of a determined respective solver 350$_1$, 350$_2$, . . . , 350$_n$ to perform operations to solve a corresponding reformulation problem. At the master controller, the original problem and parameters are reformulated according to the identified or user-specified property and communicated to the respective solver device 350$_1$, 350$_2$, . . . , 350$_n$.

FIG. 5 further depicts example solving stage operations of a client controller 210 which initiates and controls solver operations at 270 to solve a received reformulation. At 273, the client controller determines whether in solving the particular reformulation problem there results in a change of state as a result of certain algorithm processing. For example, the client controller 210 may execute logic to identify specific solver operations and obtain results, such as a change of state of a solution, of implemented algorithms such as, but not limited to: Branch-and-bound, branch-and-cut, interior-point-methods, first-order methods, heuristics, LP/SOCP/SDP solvers, etc. If a client controller determines that solver operations do not result in a change of state, solver operations continue at 270.

Returning to 273, if a client controller determines that processing of these (or other) algorithms results in a change of the solution state, e.g., a change in an UB value, a LB value, a valid inequality, a partial gradient, then the client controller communicates signals 276 to the master controller, in an information exchange step, the various UB value, a LB value, valid inequality, or a partial gradient, such that the master controller can update the solution for the original optimization model based on the updated UB, LB, valid inequality or partial gradient values received from that solver. The MC 200 further records these updated values in associated register or storage device.

In response to receipt of a change of state UB and/or LB value(s), the master controller at 280 performs determines whether the solution converges by checking whether the difference between the updated UB and LB values for the original optimization model exceeds the specified tolerance value "tol". If the master controller at 280 determines that the UB and LB differential has not yet reached the tolerance limit, e.g., exceeds a tolerance value, then operations continue by communicating a signal back to the respective client controller 210 to continue solver operations and the particular algorithms therein at step 270. Otherwise, at 280, if it is determined that the UB and LB differential has reached the tolerance limit, e.g., is less then a tolerance "tol" value, then at 290 the master controller computes a solution to the original optimization model and outputs the resulting solution set, e.g., UB, LB and solution set results and the process ends.

Figure 6:
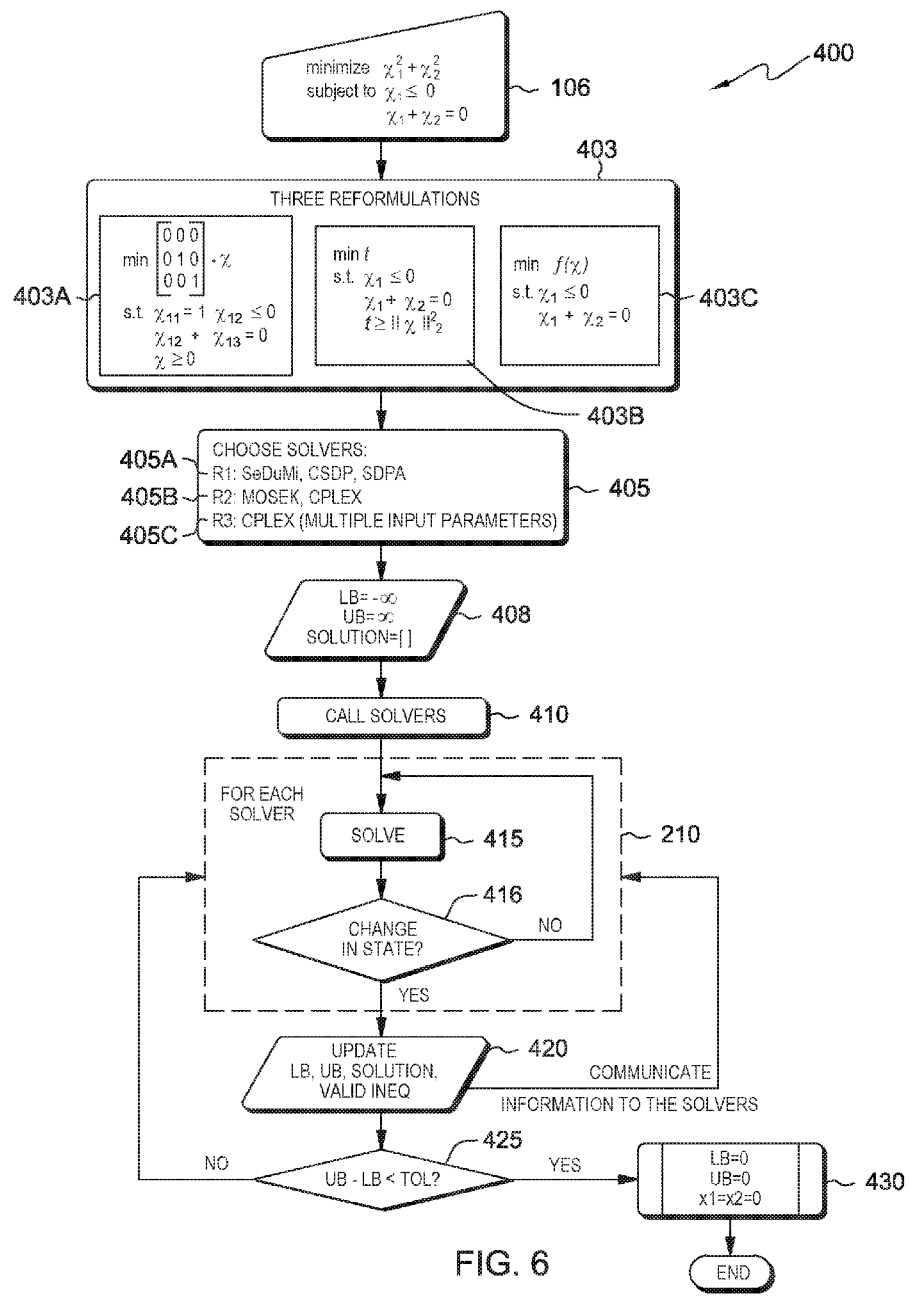
FIG. 6 depicts an exemplary method run by a master controller device for solving an example input convex quadratic optimization model structure with two variables input such as described with respect to the analysis method of FIG. 3.

Turning to FIG. 6, there is depicted an exemplary method 400 run by a master controller device 200 for solving the example convex quadratic optimization model structure with two variables (e.g., min $X_1^2+X_2$) input 106 such as described with respect to the analysis method 100 of FIG. 3. At a first step 403, the alternative formulations for the given optimization model are decided and reformulated problems 403A, 403B and 403C are generated, with 403A comprising data representing equivalent reformulated problem in the form of a separate structured SDP problem, with 403B comprising data representing equivalent reformulated problem in the form of a separate structured SOCP problem, and with 403C comprising data representing equivalent reformulated problem in the form of a separate structured PWL problem. The master controller 200 is provided with functionality to launch parallel solution approaches; or alternatively, a time slice approach wherein a single solver processes an algorithm for a predetermined amount of time as controlled by the master controller (and client controller) and the master controller controls switching of processing time to a next solver that runs another reformulated problem for a time slice, and the switching process continues in a sequential manner.

Then at step 404, the master controller device 200 determines a number of solvers that can be used for solving each of the reformulated problems 403A, 403B and 403C input to the solver infrastructure 300 for solving in parallel. As one example, a set 405A of three different solvers may be used to solve the first reformulated SDP problem 403A including a Self-Dual-Minimization solver (SeDuMi) solver package for solving general conic optimization problems, a CSDP solver package running on a system for solving the semi-definite programming problem designed to handle constraint matrices with general sparse structure; and a SemiDefinite Programming Algorithm (SDPA) solver package running on a device 350. Likewise the master controller 200 may determine a set 405B of two different solvers that may be used to solve the second reformulated SOCP problem 403B including a MOSEK solver used for the solution of linear, mixed-integer linear, quadratic, mixed-integer quadratic, quadratically constraint, and convex nonlinear mathematical optimization problems; and a CPLEX optimization solver (e.g., a ILOG CPLEX optimizer such as available from International Business Machines Incorporated) which is configured to solve integer programming problems, very large linear programming problems using either primal or dual variants of the simplex method or the barrier interior point method, convex and non-convex quadratic programming problems, and convex quadratically constrained problems. Likewise the master controller 200 may determine a further solver 405C including a CPLEX (multiple input parameters) solver for solving the third reformulated PWL problem 403C.

Continuing, at 408, the upper bound limits and lower bound limits are set to ∞, −∞ respectively. Additionally, the solution set is set to empty, e.g., set [ ]. At 410, the master controller communicates a signal to trigger one or more of the client controllers $210_1$, $210_2$, . . . , $210_n$ to initiate operations at each determined solver of each example respective solver set 405A, 405B, 405C. At 415 a respective client controller (generically referred to as client controller 210) performs operations to solve a respective reformulated problem.

At 416, the client controller 210 determines whether, in solving the particular reformulation problem, there results in a change of a state of a solver's generating an intermediate result of the algorithm used to solve a reformulated problem at that solver. For example, the client controller 210 may identify results of specific solver algorithms implemented (e.g., Branch-and-bound, branch-and-cut, interior-point-methods, first-order methods, heuristics, LP/SOCP/SDP solvers, etc.) and determine whether these identified results indicate or result in a change of state, e.g., an UB, LB, valid inequality, or a partial gradient. If, at 416, if it is determined that processing of these (or other) algorithms results in a change of the solution state, e.g., a change in an UB value, a LB value, a valid inequality, a partial gradient, etc., then the client controller communicates signals to the master controller 200 which, at 420, updates the various UB value, a LB value, valid inequality, or a partial gradient values, as a solution for the original optimization model, and records these values in associated register or storage device.

Alternatively or in addition, the updated UB, LB, valid inequality, or partial gradient value from a solver are communicated by the master controller 200 back to each of the other remaining solver devices via communication link 601 such that each independent solver may exploit other solvers' intermediate results. In this scenario, the master controller may first determine the feasibility of the provided solution (e.g., intermediate result UB, LB value or a valid inequality constraint) by determining whether the received intermediate value may lead to an optimal solution of the objective function of the optimization model or whether is it within a specified tolerance. Thus, the master controller may terminate operations at one or more solvers that provide a non-optimal solution, or provide an intermediate result that may not lead to a viable objection function solution, e.g., by being outside of the upper bound and lower bound constraints. Alternatively, or in addition, the master controller may choose which intermediate results values received from one solver are to be forwarded to which other parallel running solvers.

In response to receipt of a change of state value(s), the master controller performs a check at 425 as to whether the difference between the UB and LB values received exceeds a tolerance value. If the master controller at 420 determines that the UB and LB differential has not yet reached the tolerance limit, i.e., still exceeds a tolerance value, then operations continue by communicating a signal back to each respective client controller 210 to continue solver operations and the particular algorithms therein at step 415. Otherwise, at 425, if it is determined that the UB and LB differential has reached the tolerance limit, i.e., is less then a tolerance "tol" value, then at 430 the master controller outputs a resulting solution set, e.g., UB, LB and solution set [ ] results and the process ends.

Figure 7:
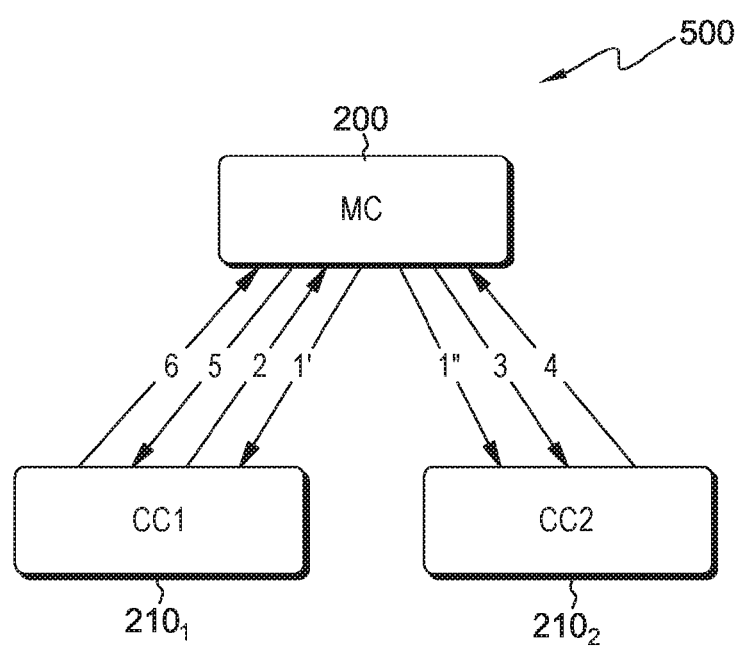
FIG. 7 depicts an example communication flow of signals between two example client controllers (CCs) and the master controller (MC) for the example method of FIG. 6.

For the programming example of FIG. 6, FIG. 7 depicts an example communication flow of signals 500 between two example CCs 210A, 210B and the MC 200 of FIG. 4.

In FIG. 7, signal indicated as signal 1' and 1" represents MC signals for starting two processes for two solvers. Signal 2 is a response by the first client controller CC1 $210_1$ in the form of a signal communicated to the MC 200 reporting a change in state of solver1 (e.g., a LB value). In response the MC updates the LB value for the solution of the original optimization problem. Signal 3 represents a signal sent by the MC that includes intermediate results information (e.g., change of state of CC1 $210_1$) to second client controller solver CC2 $210_2$ for exploitation thereof. That is, the new updated LB value is sent to the other CC2 solver for use in solving its reformulated problem. Subsequently, a signal is generated by the second client controller CC2 $210_2$ in the form of a Signal 4 communicated to the MC 200 reporting a change in state of solver2 (e.g., a changed UB value). Then the MC 200 updates the UB value for the original optimization model solution and the MC 200 determines whether the solution warrants communication back to the other solvers. If the solution warrants communication back to the other solver, the MC 200 generates and sends a signal representing the updated information back to client controller CC1 $210_1$. Then, client controller CC1 $210_1$ may subsequently generate a Signal 6 reporting by the CC1 a change in state of solver1 (e.g., a changed LB value), for use by the MC 200 which responsively updates the LB value. At this point, it may be determined by the MC 200 whether solution convergence is achieved, i.e., that UB-LB<tol, in which case the MC 200 will initiate signals and send these signals to each respective client controller to terminate operations at the respective solvers.

Thus, a method, system and computer program product automates the creation of alternative model formulations, as opposed to the current state of manual reformulation by a user. The method, system and computer program product further reduces the need for expert knowledge in order to create alternative model reformulations. The method, system and computer program product further addresses a solution of optimization models which cannot currently be solved in a reasonable time by detecting and launching alternative approaches for the same model in parallel and automatically, as opposed to the manual sequential process.

Figure 8:
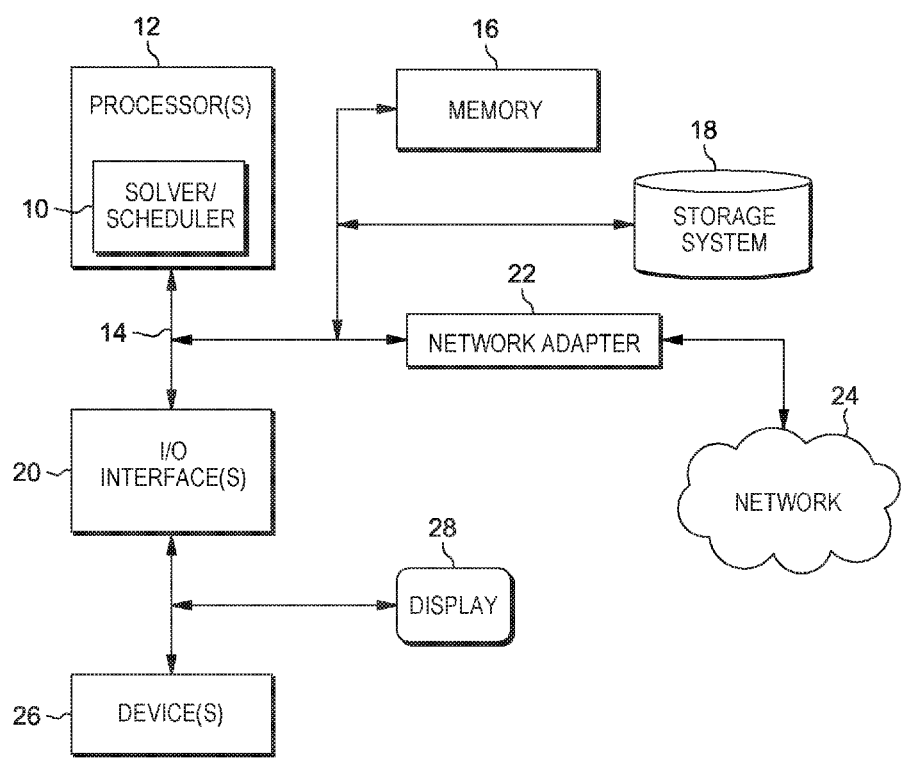
FIG. 8 illustrates a schematic of an example computer or processing system that may be used to solve the optimization model according to one embodiment of the present disclosure.

FIG. 8 illustrates a schematic of an example computer or processing system that may solve the optimization model according to one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods of the master controller component 200 as described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include. Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to solve an optimization model comprising:
    receiving, at a computing device, data representing a formula and parameters associated with the optimization model to be solved;
    automatically analyzing, by the computing device, a structure of said received data to identify multiple alternative formulations of said optimization model;
    automatically generating, by the computing device, data representing multiple reformulated problems, each reformulated problem corresponding to said multiple alternative formulation of said optimization model and each having a different structure and associated parameters for solving said optimization model;

for each reformulated problem, determining one or more solver devices for solving the reformulated problem in parallel, the one or more solver devices configured to solve a respective reformulated problem using a respective different algorithm;

communicating, by the computing device, the generated data representing a respective reformulated problem to a respective determined one or more solver devices for solving that reformulated problem, each respective solver device of said determined one or more solver devices receiving data associated with the respective reformulated problem and each said solver device of said determined one or more solver devices configured to solve the respective reformulated problem;

generating, at respective one or more solver devices, data representing intermediate solution results of the respective reformulated problem;

receiving, at said computing device, each generated intermediate solution result data from the respective one or more solver devices, said data representing a change of a solution state of a result of a respective algorithm used in solving the respective reformulated problem at the respective one or more solver devices;

determining whether any received intermediate solution result data leads to a feasible solution of the optimization model; and if said received intermediate solution result data leads to a feasible solution, updating a solution set for said optimization model and communicating intermediate results values received from one solver device to other parallel running solver devices running a different algorithm.

2. The method of claim 1, wherein a received further data is a changed value of a boundary variable or a constraint associated with the algorithm running at a respective solver device, said method further comprising:

updating, at the computing device, in response to receipt of the changed boundary variable or a constraint value, a solution set for the optimization model.

3. The method of claim 2, further comprising:

determining, by the computing device, based on the received changed boundary variable or a constraint value, whether the optimization model has been solved; and communicating a signal to each said respective other solver device to initiate terminating the solving of said reformulated problem at the respective solver device responsive to determining the optimization model has been solved.

4. The method of claim 1, further comprising:

determining whether the updated changed boundary variable or a constraint value is useful in solving a respective reformulated problem at other respective solver devices; and communicating, by the computing device, a data signal representing the updated changed boundary variable or constraint value for receipt at each determined other respective solver device, wherein each other respective solver device runs an algorithm configured to solve a reformulated problem at that respective solver device using a received updated changed boundary variable or constraint value.

5. The method of claim 1, wherein said change of a boundary variable or a constraint value of an algorithm run to solve a respective reformulated problem comprises one of: an upper bound value, a lower bound value, a valid inequality value or a partial gradient value.

6. The method of claim 5, wherein said determining, by the computing device, based on the received changed boundary variable or a constraint value, whether the optimization model has been solved comprises:

determining at said computing device whether the received changed boundary variable or a constraint value satisfies a specified convergence condition.

7. A system to solve an optimization model comprising:

a memory storage device for storing data representing an optimization model to be solved;

one or more hardware processor units in communication with said memory storage device, and at least one hardware processor unit configured to:

receive data representing a formula and parameters associated with the optimization model to be solved;

automatically analyze a structure of said received data to identify an multiple alternative formulations of said optimization model;

automatically generate data representing multiple reformulated problems corresponding to said multiple alternative formulation of said optimization model, each reformulated problem having a different structure and associated parameters for solving said optimization model; and for each reformulated problem, determine one or more of other hardware processor units running a solver for solving the reformulated problems in parallel, the one or more hardware processor units configured to solve a respective reformulated problem using a respective different algorithm;

communicate the generated data representing a respective reformulated problem to a respective determined one or more other hardware processor units running a solver for solving that reformulated problem, each respective hardware processor unit running a solver receiving data associated with the respective reformulated problem, and each said respective hardware processor unit configured to solve the respective reformulated problem;

generate, at said respective hardware processor unit, data representing intermediate solution results of the respective reformulated problem;

receive each generated intermediate solution result data from the respective one or more hardware processor units, said data representing a change of a solution state of a result of a respective algorithm used in solving the respective reformulated problem at the respective one or more hardware processor units;

update a solution of said optimization model based on the received change of solution state;

determine whether any received intermediate solution result data leads to a feasible solution of the optimization model; and if said received intermediate solution result data leads to a feasible solution, update a solution set for said optimization model and communicate intermediate results values received from one hardware processor unit back to other parallel running hardware processor units running a different algorithm.

8. The system of claim 7, wherein a received further data is a changed value of a boundary variable or a constraint associated with the algorithm running at a respective hardware processor unit, said at least one hardware processor unit further configured to:

update in response to receipt of the changed boundary variable or a constraint value, a solution set for the optimization model.

9. The system of claim 7, wherein said at least one hardware processor unit is further configured to:
determine whether the updated changed boundary variable or a constraint value is useful in solving a respective reformulated problem at other respective hardware processor units running a respective programmed solver; and
communicate a data signal representing the updated changed boundary variable or constraint value for receipt at each determined other hardware processor unit, wherein each other respective hardware processor unit runs a solver including an algorithm configured to solve a reformulated problem using a received updated changed boundary variable or constraint value.

10. The system of claim 8, wherein said at least one hardware processor unit is further configured to:
determine, based on the received changed boundary variable or constraint value, whether the optimization model has been solved; and
communicate a signal to each said respective other hardware processor unit running a solver to initiate terminating the solving of said reformulated problem at the respective hardware processor unit responsive to determining the optimization model has been solved.

11. The system of claim 7, wherein said change of a boundary variable or constraint value of an algorithm run to solve a respective reformulated problem comprises one of: an upper bound value, a lower bound value, a valid inequality value or a partial gradient value.

12. The system of claim 11, wherein to determine based on the received changed boundary variable or constraint value whether the optimization model has been solved, said at least one hardware processor unit is further configured to:
determine from a changed boundary variable or constraint value received from a hardware processor unit, whether the changed state variable value satisfies a specified convergence condition.

13. A computer program product comprising:
a non-transitory computer readable media embodying a program of instructions executable by a processing unit for solving an optimization model, the program of instructions, when executing, perform a method to:
receive data representing a formula and parameters associated with the optimization model to be solved;
automatically analyze a structure of said received data to identify an alternative formulations of said optimization model;
automatically generate data representing multiple reformulated problems corresponding to said multiple alternative formulation of said optimization model, each reformulated problem having a different structure and associated parameters for solving said optimization model; and
for each reformulated problem, determine one or more other processing units running a solver for solving the reformulated problems in parallel, the one or more processing units configured to solve a respective reformulated problem using a respective different algorithm;
communicate the generated data representing a respective reformulated problem to a respective determined one or more other processing units running a solver for solving that reformulated problem, each respective processing unit running a solver receiving data associated with the respective reformulated problem, and each said respective processing unit configured to solve the respective reformulated problem using said solver;
generate data representing intermediate solution results of the respective reformulated problem;
receive each generated intermediate solution result data from the respective one or more hardware processor units, said data representing a change of a solution state of a result of a respective algorithm used in solving the respective reformulated problem at the respective one or more hardware processor units;
update a solution of said optimization model based on the received change of solution state;
determine whether any received intermediate solution result data leads to a feasible solution of the optimization model; and
if said received intermediate solution result data leads to a feasible solution, update a solution set for said optimization model and communicate intermediate results values received from one processing unit back to other parallel running processing units running a different algorithm.

14. The computer program product of claim 13, wherein a received further data is a changed value of a boundary variable or a constraint associated with the algorithm running at a respective processing unit solver, said program of instructions, when executing, further configure at least one hardware processor unit to:
update, in response to receipt of the changed boundary variable or a constraint value, a solution set for the optimization model.

15. The computer program product of claim 14, wherein said program of instructions, when executing, further configure at least one hardware processor unit to:
determine based on the received changed boundary variable or a constraint value, whether the optimization model has been solved; and
communicate a signal to each said respective other solver device to initiate terminating the solving of said reformulated problem at the respective solver device responsive to determining the optimization model has been solved.

16. The computer program product of claim 13, wherein said program of instructions, when executing, further configure at least one hardware processor unit to:
determine whether the updated changed boundary variable or a constraint value is useful in solving a respective reformulated problem at other respective solver devices; and
communicate a data signal representing the updated changed boundary variable or constraint value for receipt at each determined other respective solver device, wherein each other respective solver device runs an algorithm configured to solve a reformulated problem at that respective solver device using a received updated changed boundary variable or constraint value.

17. The computer program product of claim 13, wherein to determine based on the received changed boundary variable or a constraint value whether the optimization model has been solved, said program of instructions, when executing, further configure at least one hardware processor unit to:
determine whether the received changed boundary variable or a constraint value satisfies a specified convergence condition.

* * * * *